United States Patent
Ma et al.

(10) Patent No.: US 6,344,887 B1
(45) Date of Patent: Feb. 5, 2002

(54) FULL SPECTRUM REFLECTIVE CHOLETERICS DISPLAY EMPLOYING CIRCULAR POLARIZERS WITH THE SAME POLARITY BUT DIFFERENT DISPOSITION

(76) Inventors: Yao-Dong Ma; Calvin Ma, both of 1241 Richland Oaks Dr., Richardson, TX (US) 75081

( * ) Notice: Subject to any disclaimer, the term of this patent is extended or adjusted under 35 U.S.C. 154(b) by 0 days.

(21) Appl. No.: 09/393,947

(22) Filed: Sep. 10, 1999

(51) Int. Cl.[7] .................. G02F 1/1335; C09K 19/02
(52) U.S. Cl. ................ 349/98; 349/175; 349/176
(58) Field of Search .................. 349/98, 175, 176, 349/169

(56) References Cited

U.S. PATENT DOCUMENTS

| | | | | |
|---|---|---|---|---|
| 5,146,355 A | * | 9/1992 | Prince et al. | 359/50 |
| 5,548,422 A | * | 8/1996 | Conner et al. | 359/65 |
| 5,619,355 A | * | 4/1997 | Sharp et al. | 349/78 |
| 5,625,477 A | * | 4/1997 | Wu et al. | 349/35 |
| 5,751,385 A | * | 5/1998 | Heinze | 349/61 |
| 5,796,454 A | * | 8/1998 | Ma | 349/98 |
| 6,141,069 A | * | 10/2000 | Sharp et al. | 349/98 |

FOREIGN PATENT DOCUMENTS

JP          61-272723 A    * 12/1996

* cited by examiner

Primary Examiner—William L. Sikes
Assistant Examiner—Tarifur R. Chowdhury (57) ABSTRACT

This invention is related to a full spectrum reflective or tranmissive black-and-white cholesteric liquid crystal display. The white state is realized by a full gamut of light reflection or transmission in the display's planar texture, and the black state is created by cholesterics' scattering type depolarization effect and polarizer's filtration effect in the display's focal conic texture. It has been discovered that the scattering depolarization effect and multi-filtration process can generate a black dark state, the optical "off" state in focal conic texture of cholesteric liquid crystals. In the dark-and-white cholesterics display can be easily upgraded to a full color display by means of micro-color filter structure in both front and back illuminating systems.

13 Claims, 4 Drawing Sheets

FIG.6B

FULL SPECTRUM REFLECTIVE CHOLETERICS DISPLAY EMPLOYING CIRCULAR POLARIZERS WITH THE SAME POLARITY BUT DIFFERENT DISPOSITION

BACKGROUND OF THE INVENTION

Cholesteric liquid crystal displays are characterized by the fact that the pictures stay on the display even if the driving voltage is disconnected. The bistability and multistability also ensure a completely flicker-free static display and have the possibility of infinite multiplexing to create giant displays and/or ultra-high resolution displays. In cholesteric liquid crystals, the molecules are oriented in helices with a periodicity characteristic of material. In the planar state, the axis of this helix is perpendicular to the display plane. Light with a wavelength matching the pitch of the helix is reflected and the display appears bright. If an AC-voltage is applied, the structure of the liquid crystals changes from planar to focal conic texture. The focal-conic state is predominately characterized by its highly diffused light scattering appearance caused by a distribution of small, birefringence domains, at the boundary between those domains the refractive index is abrupt changed. This texture has no single optic axis. The focal-conic texture is typically milky-white (i.e., white light scattering). Both planar texture and focal-conic texture can coexist in the same panel or entity. This is a very important property for display applications, whereby the gray scale can be realized.

Current cholesterics displays are utilizing "Bragg reflection", one of the intrinsic properties of cholesterics. In Bragg reflection only a portion of the incident light with the same handedness of circular polarization and also within the specific wave band can reflect back to the viewer, which generates a monochrome color display. The remaining spectrum of the incoming light, however, including the 50% opposite handedness circular polarized and out-off Bragg reflection wave band, will pass through the display and be absorbed by the black coating material on the back surface of the display to assure the contrast ratio. The overall light utilization efficiency is rather low and it is not qualified in some applications, such as billboard at normal ambient lighting condition. The Bragg type reflection gives an impression that monochrome display is one of distinctive properties of the ChLCD.

In many applications the human eyes are friendlier with full color spectrum, i.e., white color information written on the dark background. With the development of the flat panel display more and more displays with neutral color is come into being, such as black-and-white STN display and AMTFT display, etc. Unfortunately, both of these approaches involve major disadvantages and limitations. The AMTFT displays are not true zero field image storage systems, as they require constant power input for image refreshing. The STN displays do not possess inherent gray scale capability as a result of the extreme steepness of the electro-optical response curve of the display. To realize a gray scale the resolution has to be reduced by using, for example, four pixels instead of one per area. Anywhere from one to four pixels are activated at a particular time to provide the gray scale effect. The AMTFT devices use semiconductors to provide memory effects and involve use of expensive, ultra high resistance liquid crystal materials to minimize RC losses. Additionally, these displays are both difficult and costly to produce and they are, at present, limited to relatively small size displays. The cholesteric display has many advantages over the STN and AMTFT display with its zero field memory effect, hemispheric viewing angle, gray scale capability and other optical performances but it needs obviously to come up with black-and-white solution in order to keep its superiority.

U.S. Pat. No. 5,796,454 introduces a black-and-white back-lit ChLC display. It includes controllable ChLC structure, a first circular polarizer laminating to a first substrate of cell has the same circular polarity as the liquid crystals, a second circular polarizer laminating to a second substrate of the cell has a circular polarity opposite to the liquid crystals, and a light source. The black-and-white back-lit display is preferably illuminated by a light source that produces natural "white" light. Thus, when the display is illuminated by incident light, the circular polarizer transmits the 50% component of the incident light that is right-circularly polarized. When the ChLC is in an "on" state, the light reflected by the ChLC is that portion of the incident light having wavelengths within the intrinsic spectral bandwidth, and the same handedness; The light that is transmitted through the ChLC is the complement of the intrinsic color of ChLC. The transmitted light has right-circular polarization, however, is thus blocked by left-circular polarizer. Therefore, the observer will perceive that region of the display to be substantially black. When the display is in an "off" state, the light transmitted through the polarizer is optically scattered by the ChLC. The portion of the incident light that is forward scattered is emitted from the controllable ChLC structure as depolarized light. The left-circularly polarized portion of the forward-scattered light is transmitted through the left-circular polarizer, thus, is perceived by an observer. The black-and-white display, in "454" patent, is generated by back-lit component and the ambient light is nothing but "noise".

It is well known that ChLCD can be used perfectly for daytime information display for its bright reflection to the front environmental lighting. Nowadays available cholesterics display is generally working in reflection mode and the black painting absorbs incoming light both opposite the handedness and out-off the selective reflection wave band. It is the black coating material that completely rolls out the possibilities of adopting the back-lit approach.

In some applications it is needed to work after dark. Take a cell phone for example, a customer need make phone call any time including nighttime and dark environment (travelling in the car). This makes ChLCD an artificial lighting system necessary. It is convenient to use front light arrangement for some types of displays such as gas pump and billboards. In the case of hand-held type of display however, the compact and ergonomic designing requires a back-lit structure.

SUMMARY OF THE INVENTION

It is the primary intention for this invention to realize the full spectrum of reflection (white color in optical "on" state) while maintaining the cholesterics display's superiority such as high ambient environment contrast ratio, hemispheric viewing angle, zero-field long time memory and so on.

It is the other intention for this invention to create the dark state for the optical "off" state so as to achieve black-and-white display, which is the foundation of the achromatic display and the full color display.

It is the other intention of this invention to render the display dual working function, i.e., during the day or bright ambient light the display works as front-lit mode and during the dark environment, back-it mode. Compared with the prior art ChLC displays the skill of the art endows the display with more user friendly and better viewing quality.

The invention is based upon the principles described as following:

Optical "On" State

First, the cholesteric material in planar texture reflects the light component with the same handedness as ChLC and a narrow bandwidth determined by its helical pitch and the optical birefringence (prior art Bragg reflection). Secondly the remaining light component out of the selective bandwidth passes the cell again, is reflected by a metal material without changing the polarization state, i.e., handedness (there is no half wave phase loss) and this component reentry the ChLC cell from back side without attenuation. The two components, one reflected by Bragg reflection with a center wavelength $\lambda_0$, and the other reflected by the metal surface, are compensatory each other and will meet together and emanate toward the viewer as full gamut of visible light. When the ChLCD is tuned in invisible Bragg reflection wavelength, for example in infrared wavelength, a full spectrum of visible light will be reflected by the metal surface, thus the viewer still perceives full spectrum white color.

Optical "Off" State

The incoming light reaches a circular polarizer with the same handedness of the ChLC and is cut more than 50%. The rest gets to the ChLC cell with focal conic texture and is depolarized by the scattering effect of the LC material. The light passes linear polarizer being cut more than 50%, then is reflected by the metal surface and further passes through either a circular polarizer or a color filter or both of them, located between the ChLC cell and the metal reflector. The remaining light passes through the ChLC cell again is depolarized by the focal conic scattered texture then cut out more than half of it by the front circular polarizer, finally, only small portion of total light has a chance to reach to the viewer. As a result, the special designed optical path, polarized-depolarized-polarized-depolarized-polarized, create a new optical dark state of cholesteric liquid crystal display. The term "polarized" means some of the light being absorbed and others becoming polarized light. And the term "depolarized" means the polarized light being neutralized by the scattering domain of LC and ready to be further cut-off. The optical "off" state produced in this way is brand new in liquid crystal display history.

In the prior arts the liquid crystal's scattering depolarization effect is used for optical "on" state, i.e., DTN (depolarized twist nematic), DPDLC (depolarized polymer dispersed liquid crystal), and transflective mode cholesteric liquid crystal display. The principle of those displays is based upon the sandwiched structure of LC cell and two layers of polarizers. When the LC cell is in the scattering state the polarized light will be depolarized and the partial light will pass the second polarizer so the display takes on the bright state or optical "on" state. When the LCD cell is in the field induced homeotropic phase or planar state the incoming light will cut completely by both the front and back polarizers so that the display takes on optical "off" state. The problem for this arrangement is that the total transparency is rather low because 75% incoming light will be cut by the combination of the polarizers and only less than 25% percent light could pass the LCD cell. This invention, however, for the first time, introduces a novel approach of applying the depolarization effect to the optical "off" state. It is described that the incoming light will be absorbed, depolarized, again absorbed, depolarized, and absorbed and finally the display almost becomes dark or black. The depolarizing efficiency of the scattering structure is entirely dependent on the reflective index of LC material and the thickness of the LC cell. The discovery in the skill of the art will create a new display dark state by using liquid crystal scattering effect.

The addition of the color filter or circular polarizer between the cell and metal reflector has no effect in the optical "on" state. The color filter leaves a path window to the remaining same handedness polarized light out of the intrinsic Bragg reflection wavelength and theoretically no light attenuation takes place. The circular polarizer faces to the metal reflector also creates a path window to the circular polarizing light and again there is no discernible attenuation to the passing light.

The full spectrum white display mode allows the LCD designer to use the longest visible wavelength such as red, so that the lowest driving voltage can be obtained and darkness of the optical "off" state can also be enhanced. In this case, the compensatory color is green-blue. If a green-blue color is chosen as the color filter's tint the display will takes on very dark green-blue "off" state. Further more if the display uses the combination of both band-pass filter and circular polarizer the optical "off" state will be very dark.

The contrast ratio is enhanced because the brightness of the display is increased while the darkness is kept the same level as the prior art display. This property facilitates the display applying in the relatively dark environment because of high efficiency of light utilization. The viewing angle is kept almost hemispheric scope without noticeable color shift.

The full spectrum of reflective cholesteric display can be realized both in visible wavelength and in invisible wavelength, for example, infrared wave band. The optical scattering effect in the infrared wavelength is the same as in visible wavelength, which is dependent on the refractive index and the pitch of the liquid crystals so that the display obtains the same optical dark state. Optical "on" state on the other hand is the fill gamut of visible light reflected by a metal reflector. A cholesteric display that works in infrared wavelength will have very fast response time and low driving voltage for the reason of lower viscosity and longer helical pitch. In the infrared wavelength, linear polarizer with the condition of optimal alignment angle can replace circular polarizer.

BRIEF DESCRIPTION OF THE DRAWINGS

FIG. 6 shows a schematic dual-mode display structure of two circular polarizers, a transflective metal reflector and back-lit panel.

DETAILED DESCRIPTION

Figure 1A:
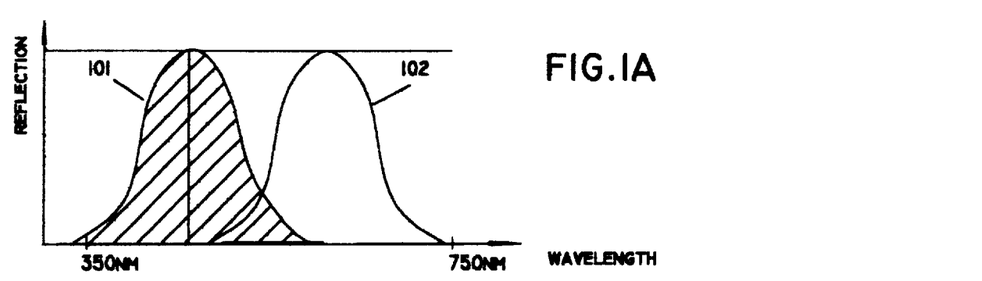
FIG. 1A shows the waveform of first Bragg reflection, the waveform of secondary reflection by a metal reflector and the synthesized full spectrum reflection.
Figure 1B:
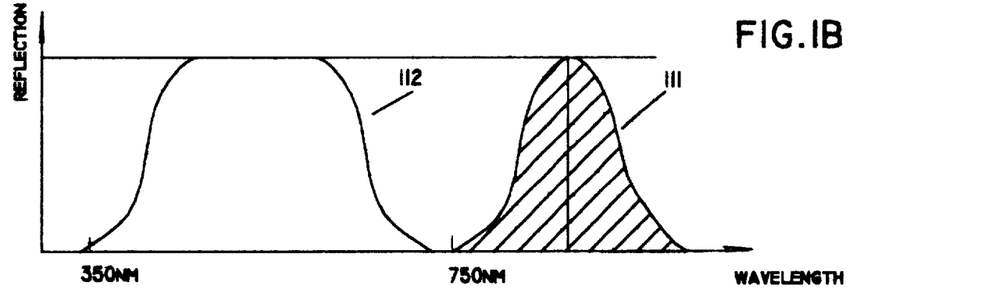
FIG. 1B shows the invisible waveform of Bragg reflection and full spectrum visible waveform of metal reflection.

Referring first to FIG. 1. Illustrated are the two waveforms of reflection. The first one is the intrinsic Bragg reflection of a cholesteric LC in the planar structure and the second one is the visible waveform reflected by a metal reflector. FIG. 1A illustrates a full spectrum "white" reflective waveforms where 101 shows the Bragg reflection of the ChLC planar texture wherein the helical pitch is tuned in the visible bandwidth, $\lambda_0$=np, 380 nm$\leq\lambda_0\leq$700 nm and 102 shows the waveform of other component reflected by the metal thin film. The two waveforms combine together to form a full spectrum visible light, white light. FIG. 1B shows a full gamut of visible light reflection where the helical pitch of the cholesteric LC is adjusted in invisible bandwidth, either in UV wave band or IR wave band. For example, the first intrinsic Bragg reflection has been tuned in infra-red bandwidth, $\lambda_0\geq$700 nm, as shown in waveform 111, all the visible spectrum 112 then is reflected by the metal reflector. One may notice that FIG. 1B demonstrates a pure white light reflection without acquiring optimal light compensation or matching with different viewing angle as it does in the FIG. 1A structure. As a result the novel display reflects both the visible wavelength and invisible wavelength when it is addressed in its planar structure. Infrared reflection mode, moreover, can be used in military application as a nighttime display and a viewer can read the information with the assistance of an infrared detector.

Figure 2:
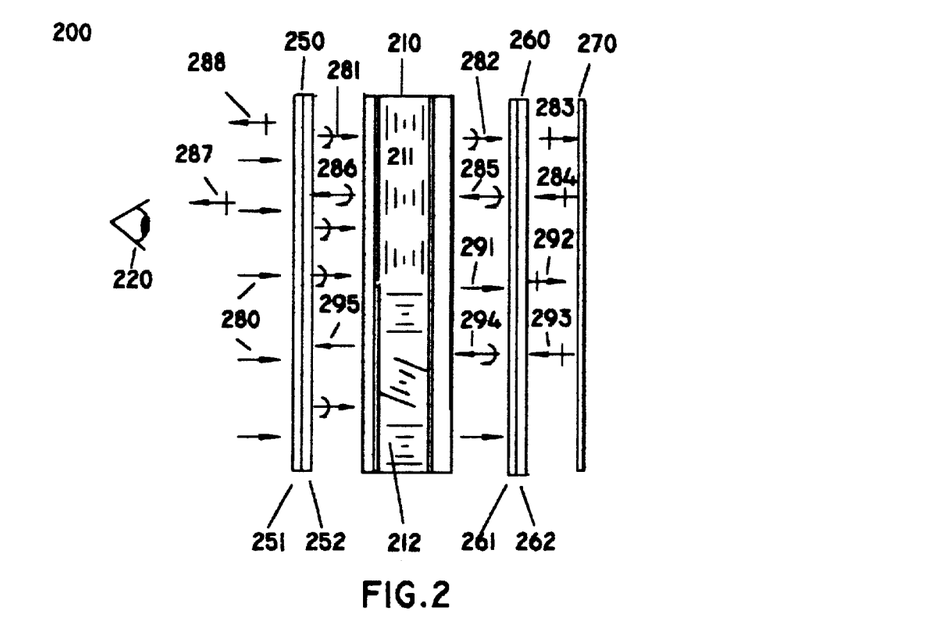
FIG. 2 shows a schematic display structure of two circular polarizers combined with a metal reflector.

Turning now to FIG. 2, illustrated is a black-and-white cholesterics display structure of two circular polarizers (CPs) combined with a metal reflector. The natural light 280 first reaches the first circular polarizer 250 with the same handedness as liquid crystal 211, for example right handed circular polarizer (RHCP) for the convenience of description. 50% left handed (LH) of incoming light is filtrated by the RHCP and other 50% right handed (RH) 281 is allowed to pass. The RH component then reaches the ChLC film 210 in the planar structure 211 and part of it, with central wavelength A and half bandwidth $\Delta\lambda(\Delta\lambda=\Delta n\ p)$ will be reflected (primary reflection) 288. And rest of it called the compensatory component 282, then passes through the ChLC film. The RH compensatory component further passes the second RHCP 260 (see light 283) without attenuation and is reflected by an Aluminum foil reflector or an Aluminum coating deposited on the plastic substrate 270 with the function of changing the light direction while maintaining the sense of polarized light. Further more the compensatory light 284 passes all the way through the second RHCP (see light 285), ChLC film (see light 286), the first RHCP without optical loss and finally emerges to the display front surface 287 (secondary reflection). In this way, a viewer can see a full spectrum visible light including the primary reflective component 288 and the secondary reflective component 287.

The first and second CPs 250, 260 are made of linear polarizers 251, 262 and ¼ $\lambda$ retardation films 252, 261 with 45° superimposed together. The different between U.S. Pat. No. 5,796,454 and this invention can be described as follows. In U.S. Pat. No. 5,796,454, the two CPs are arranged opposite handed and the second polarizer is arranged with its retarder side toward the reflector and its linear polarizer side to the display substrate so that it absorbs all the incoming light without counting its handedness. In the present invention two CPs are designed in the same handedness, which not only have the same handedness with each other but keep the same handedness with cholesteric liquid crystal as well. The two RHCPs are arranged in such a way that the retardation films contact the two sides of the display substrates respectively, and with one linear polarizer 251 side arranged toward the viewer and the other linear polarize 262 side contacted with metal reflector. Compared to the prior art technology, therein only relying on the Bragg reflection, the reflection luminance in present invention is remarkably increased by the second optical path. One may notice the fact that the Bragg reflection is not attenuated by the first CP because of the same circular handedness as the liquid crystal material. Meanwhile, the metal foil reflects the compensatory light passing all the way to the front, the second optical path with the same handedness as the first one.

Both the two optical paths should have the same angular distribution, i.e., mutually matching over a wide viewing angle so that the display looks white in planar texture area. There are two approaches to match the two paths. First the display itself is designed to single domain planar structure by means of surface treatment such as rubbing the surface coated with polyimide and it turns out so called dichroic mirror. The metal reflector then is also designed in the way of mirror surface. The two reflected light beams enable display to exhibit white color within certain viewing angle. A diffusing layer coated on the front CP surface, which is functioned as an anti-glare layer originally, can realize the large viewing cone. The second approach is to obtain multi-domain planar structure by controlling the surface phys-chemical conditions to assure the wide angle reflective distribution of the incoming light. And the metal reflector is then designed with a specific surface condition wherein the wide reflective distribution can be achieved. The angular matching condition can be satisfied naturally in such way without addition of the diffusing material.

In the case of infrared ChLC formulation the angular distribution of the display is entirely dependent of the metal reflector because the metal reflective film will reflect all the visible white light with predetermined angular distribution. When the ChLCD is tuned in invisible wave band it is highly recommended to use linear polarizers instead of the circular polarizers if only the angle between the main molecular axis and the optical axis of the linear polarizer meets the light guiding requirements.

As the ChLC domains addressed in a focal conic structure 212 the display works at optical "off" state. The incident light 280 reaches the first CP 250 with the same handedness as the ChLC and is cut more than 50%. The rest 281 will get to the ChLC cell with focal conic texture and be depolarized by the scattering effect of the LC material. The neutral non-polarized light 291 then passes linear polarizer 261, becomes linear polarized at the cost of at least 50% light being cut off. The linear polarized light is then reflected by the aluminum thin layer 270 and further is circularly polarized by the second CP 260, located between the ChLC cell and the metal reflector. The remaining light 294 passes the ChLC cell again and becomes depolarized light 295 due to the focal conic scattering effect. The non-polarized remaining light reaches the first CP and half of it is lost. Finally, only small portion of total light less than 4% can reach to the front as scattered polarized light. The scattering emerged light has large viewing cone so that human eye perceives only a small portion of it. In the prior art ChLC display, when the incoming light reaches the display panel in focal conic structure, roughly 95% of it is forward scattered and absorbed by the following black coating layer while 5% of it is back scattered to the viewer. In this point of view the new approach can realize the same darkness as the prior art did. As a result, the special designed optical path, polarized depolarized-polarized-depolarized-polarized, creates a new optical dark state of ChLCD. The term "polarized" means some of the light being absorbed and others becoming polarized light. And the term "depolarized" means the polarized light being neutralized by the scattering domain of LC and ready to be further cut-off. To the knowledge of the applicant, the optical "off" state derived in this way is unprecedented in liquid crystal display history.

The black-and-white display introduces a novel way to realize real video display with relative higher contrast ratio and brightness. Normal cholesteric display with video rates does not look bright because of most of the incoming light being absorbed by the black back coating material. The transition time limited the domain size of the liquid crystal so that the total reflection of the display at high switching speed is not as good as that of low driving speed. By utilizing the full spectrum of incoming light, the total brightness of the display is enhanced even in the video rate driving speed. The other physical parameter that benefit to the video rate is the longer wavelength of the selective reflection and low threshold voltage of the display, for example the red color and the compensate color green-blue. The black-and-white display with lower driving voltage and the lower viscosity liquid crystal formulation due to the longer helical pitch of ChLCD will result in a faster driving speed. While the red color monochrome display looks poor for the normal display mode although the driving voltage is lower than that of other wave band monochrome displays. Finally, by so doing, a reflective black-and-white video speed display can be achieved.

Figure 3:
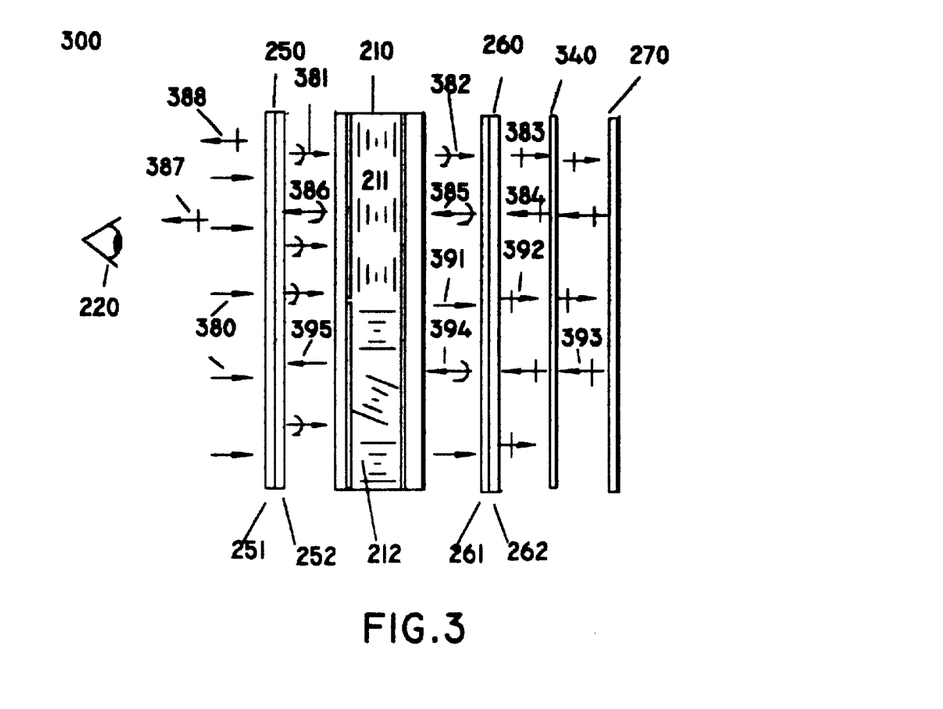
FIG. 3 shows a schematic display structure of two circular polarizers, a band-pass filter with a metal reflector.

Turning now to FIG. 3 illustrated is a schematic display structure of ChLC cell 210, two circular polarizers 250, 260, a band-pass filter 340 and a metal reflector 270. The planar texture area 211 takes on the white color with the same principle of the FIG. 2. The band-pass filter is designed to have a pass window to the compensatory color. For example, if the display's Bragg reflection reflects yellow color with the center wavelength 490 nm the transmitted compensatory is blue, the transparent window of the band-pass filter will be in 650 nm. There is no any negatively impact on the optical path in optical "on" state.

In display's focal conic texture area 212 there will be a sufficient black background. The process can be described as following. The incident light 380 reaches the first CP 250 being cut-off more than 50%. The polarized light 381, which get to the ChLC cell with focal conic texture, is depolarized by the scattering effect of the LC material. The neutral non-polarized light 391 then passes linear polarizer 261 being cut more than 50%, and reaches the band-pass filter 340. It turns out that all visible light bandwidth except the blue will be blocked. Generally, more than 60% light is being cut-off by the band-pass filter. The remaining blue light 393 is reflected by the aluminum thin layer 270, bounced through the filter and the second CP 260, located between the ChLC cell and the metal reflector. The remaining light 394 passes the ChLC cell again and becomes depolarized light 395 due to the focal conic scattering effect. The non-polarized remaining light reaches the first CP 250 and half of it is lost. Finally, only small portion of total light less than 1% can finally reach to the viewer.

The other possible arrangement is to exchange the position of second CP and band-pass filter. The incident light passes the first CP being cutoff more than 50%. The remaining polarized light, which gets to the ChLC cell with focal conic texture, is depolarized by the scattering effect of the LC material. When the neutral white light reaches the following band-pass filter, more than 60% remaining light is being cut-off. The neutralized blue light then passes the linear polarizer being cut more than 50%, and is reflected by the aluminum thin layer. The bounced blue light is further circularly polarized by the second CP. The remaining blue circular polarized light passes the ChLC cell again and becomes depolarized due to the focal conic scattered effect. The neutralized remaining dark blue light reaches the first CP and more than 50% of it is absorbed. Finally, only very small portion of total incoming light (1%) can emerge to the viewer. The contrast ratio of this design is so high that it creates a display with gray scale and full color capability. Principally, a decent white and dark blue display can be derived by omit the second CP mentioned above though the contrast ratio is not as good as the arrangement where the two CPs are used.

Figure 4:
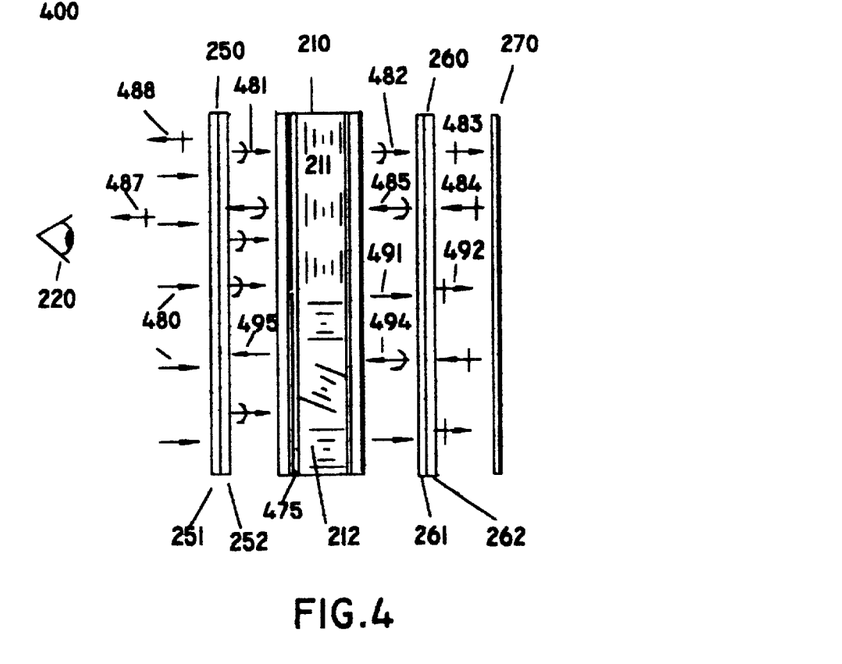
FIG. 4 shows a schematic full color display structure of two circular polarizers, a color filter with a metal reflector.

Turning now to FIG. 4 illustrated is a full color cholesterics display using a microcolor filter 475 deposited on the imaged electrodes of front display panel 210. The optical performance is the same as FIG. 2 except for the white reflective color being further modulated by the color filter. The black-and-white display can be very easily converted to a full color display in the same way as a reflective STN or a reflective TFT display does. The difference is that the former display has to locate the micro color filter in front of the display cell if the Bragg reflection is chosen in visible wavelength so that the filter would modulate both Bragg reflection and metal reflection. However, when the Bragg reflection is chosen in invisible wavelength, the color filter can be located either front panel or back panel of the display. Practically, hand-held computer or other portable displays require full color and video rate, a new trend of display application. Given such consideration, a reflective display without back lighting is the best candidate, where the front color filters is usually adopted. This is the other mode of Cholesterics full color display besides of U.S. Pat. No. 5,825,451, grand to the applicant in the title of "methods of manufacturing multi-color liquid crystal display using in-situ mixing". Compared with STN and TFT display cholesterics display has many obvious advantages. First, the storage effect can make the display unlimitedly high resolution while STN is very hard to reach to 240 lines, and TFT needs to use storage capacitor to hold the voltage thus decreases the aperture ratio of display. Secondly, cholesterics display has lower manufacturing cost, simpler production process and higher yield than that of both STN and TFT display. Thirdly, the display performance such as viewing angle is much better than the STN display, an important factor for the hand-held computer application.

Figure 5:
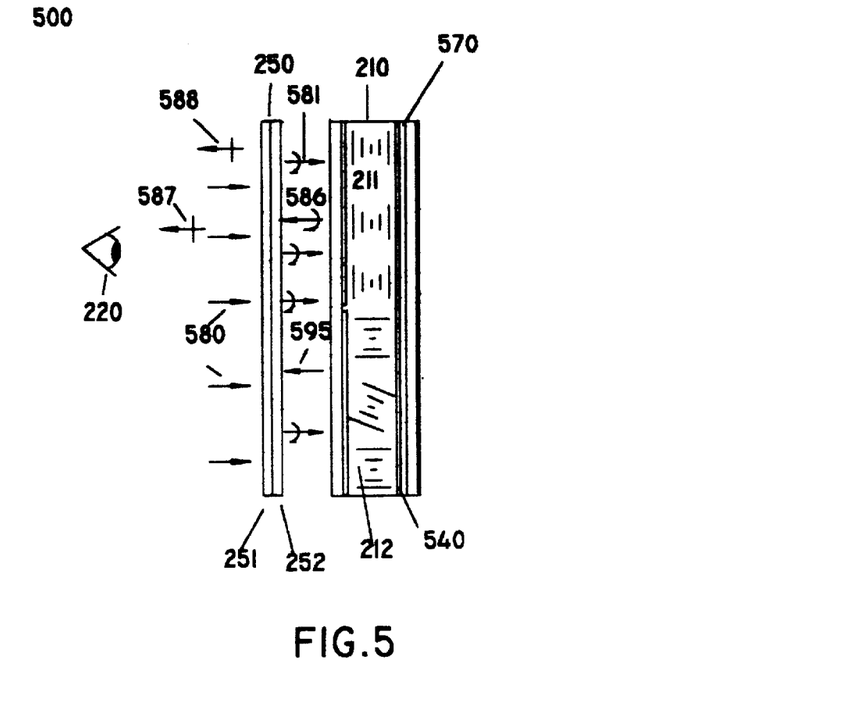
FIG. 5 shows a schematic display structure of a circular polarizer, a band-pass filter and a metal conductive pattern as a reflector.

FIG. 5 gives rise to a new display structure design although the principle is the same as FIG. 4. The reflector of the metal material 570 is actually the electrodes of the display and the band-pass filter 540 overcoat on the reflective electrodes works also as an alignment layer with the thickness of 0.5–1.0 micrometer. This structure omits the second circular polarizer and therefore it has following advantages.

First, the electrodes designed in this way have very low resistivity (many order of magnitudes lower than that of the ITO). This makes a very large panel or area display, especially a plastic substrate display viable, where both the conducting layer and the band-pass layer can be print or coat onto the substrate on the roll-to-roll bases.

Secondly, the display design eliminates the parallax effect of displaying image occurred on the liquid crystal layer and its shadow on the reflector. This is an important feature when a display is designed to render a high information content in a reasonably small display area.

Thirdly, a high brightness paper-white optical "on" state is achieved because the total layer of materials is reduced. The trade-off is that the optical "off" state is not pure black but dark color tint, for example dark blue as above-mentioned optical "off" state.

Finally, The side effect of the structure is the cost reduction because metal deposition is much cheaper than that of ITO layer, and furthermore, less optical functional film is consumed and the total thickness is reduced.

Figure 6A:
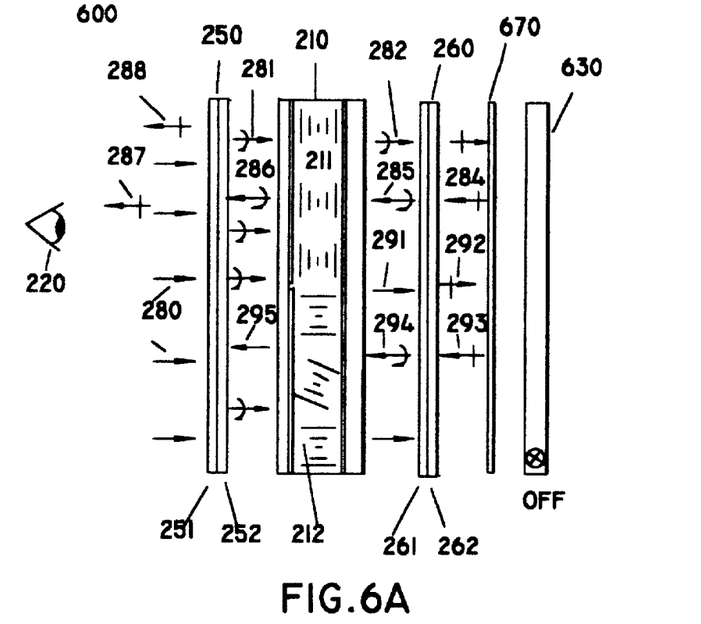
FIG. 6A shows a front lighting reflective display mode and FIG. 6B shows a back lighting transmissive display mode.
Figure 6B:
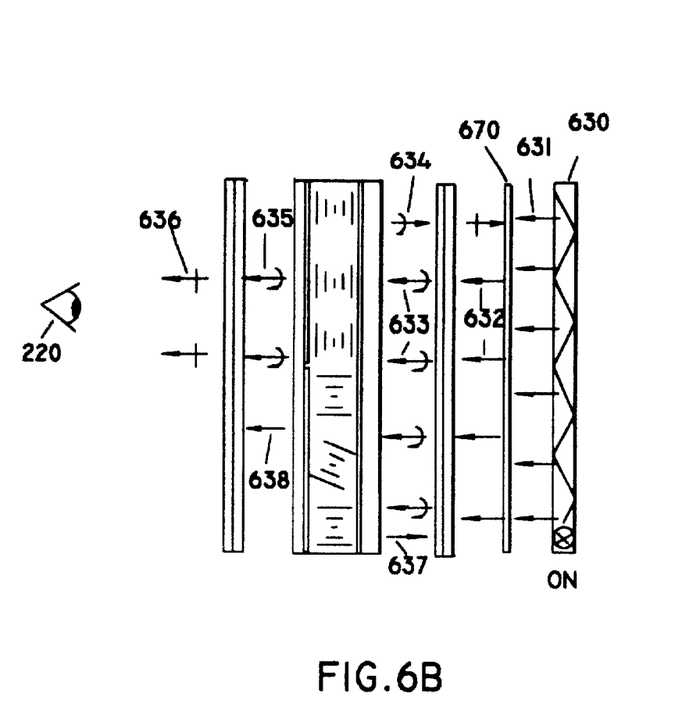

Turning now to the FIG. 6 illustrated is a dual-mode display structure including a ChLC cell 210, two circular polarizers 250, 260, a transflective metal reflector 670 and back-lit panel 630. FIG. 6A shows reflective mode when the ambient light illuminates the display. The ChLCD basically has the same structure as FIG. 2 as far as the black-and-white full spectrum reflective display as concerned. The difference is nothing but the addition of the Back-lit panel and half-transmission-half-reflection Aluminum coating layer. FIG. 6B shows transmissive display mode at nighttime or in a dim ambient light during the daytime. The back-lit mode can be turned "on" either manually or automatically. The display's principle is described as following. When the display works in the planar structure 211. The light beam 631 emitted by back-lit component passes the transflective film 670 and reaches the second CP 260 and consequently becomes circular polarized 633. The polarized light then reaches the ChLCD cell with planar structure, a portion of the light, which is Bragg-reflected, 634 will bounce through the second CP and the rest of it as compensatory color 635 will move toward to pass the first CP 250 without attenuation. At this time the viewer can sense a monochrome bright color 636, which is obviously different from the full spectrum display mode mentioned above. When the display is in the focal conic texture 212, the light 631 emitted from the back-lit panel 630 passes the transflective film 670 and reaches the second CP 260 being cut more than 50%, then consequently becomes RH circular polarized 633. The remaining RHCP light reaches the ChLC cell with focal conic structure 212 and is depolarized by the strong scattering of LC domain. The depolarized light 638 further passes the first CP with the cost of more than 50% loss and emerges to the display front surface. Out-coming light rays are keeping a large distribution angle due to ChLC scattering so that the viewer's eye can only collect a small portion of it. Thus the display is resulted in the dark "off" state, though the darkness is not as good as the daytime mode because of shorter optical path.

Whether front-lit or back-lit mode the function of the display is the same in terms of the planar optical "on" state and the focal conic optical "off" state. Even if the normal ambient light is not very dark the back lighting is still useful. When the display works in the combination of both front-lit and back-lit modes, the optical performance such as contrast ratio is still good enough and the brightness is much higher than no back-lit mode. The transflective reflector and the back-lit panel make the display higher contrast during the daytime because of its better optical dark state in the focal conic state due to the "green house" effect of the reflector and the back-lit component. The transflector can be chosen any ratio of transmission to reflection according to the applications, for example, 20%, 50% or 80% transmission, normally preferring 50%.

Various back lighting illuminators can be used, for example, CCFL (cold cathode fluorescent lamp), LED (light emitting diode) and EL (electric luminescent) panel. When the white lighting is illuminated and the ChLC is adjusted in the invisible wavelength, for example in infrared wavelength, full color back-lit display can be produced with above-mentioned micro-color filter arrangement. The full color display can work day and night since front light, back light and both are suitable for the display's illumination due to the addition of the transflective film.

Compared with the prior art ChLCD technology the full spectrum reflective or transflective mode ChLCD has five major advantages.

1. Low Driving Voltage and Low Power Consumption

According the formula, $U=2\pi^2 d\, (n/\lambda_0)(K_{22}/\Delta\epsilon)^{1/2}$, the driving voltage is inverse to the intrinsic reflection $\lambda_0$, the more wavelength of intrinsic reflection the lower driving voltage. The full spectrum reflection display allows the Bragg reflection to be chosen in the long visible wavelength or even in the infrared bandwidth. If the Bragg reflection wavelength is chosen as a red color 650 nm the threshold voltage is one sixth lower than of the green color 550 nm. And if the infrared wavelength 1100 nm is chosen the threshold voltage then becomes half of the green color. The cell thickness "d" is direct proportional to the driving voltage. In the prior art the cell gap has to meet the requirement of the reflectivity or brightness of the display in the planar structure, but in the skill of the art the gap is only required by the sufficiently depolarization efficiency in the focal conic structure. Latter allows the cell gap to be much thinner than former so that the voltage can be further reduced. Those two factors mentioned above resolve the high voltage problem of the prior art in such an extend that the skill of the art display can be compatible with normal STN and TFT drivers. Since the full spectrum reflection display has long time memory effect at zero voltage without continuous refresh, the overall power consumption is much lower than that STN and TFT display modes. This makes the display the best candidate for the portable electronic displays, where the longevity of battery is a key factor.

2. High Dynamic Driving Speed

The characteristic of long wavelength reflection of the new display reduce the usage of the chiral nematic material to the nematic LC material so as to decrease the viscosity of the liquid crystal formulation. The response time of the first dynamic process then is reduced remarkably. Meanwhile the cell gap reduction further reduced the relaxation time from phase induced nematic to the cholesteric planar structure shortening the second dynamic process of the response time. As a result the driving speed is much faster than the prior ChLCD displays.

3. High Display Quality

The integration from monochrome to full spectrum black-and-white display and to full color display makes the ChLCD more human friendly while maintaining the merits of the prior art, such as long term zero field memory, large viewing angle, sunlight readability and so on. Black-and-white cholesterics display is the ideal solution for the high information content electronic newspaper and electronic books. The full color display, moreover, facilitates the proliferation modern information industry.

4. Better Display Mode

Transflective display is an important expansion on the bases of the prior reflective display. The prior art adopt a black coating attached to the back of display rendered the display only relying on the front light, which is not viable to many applications. The all-day-long illuminating solution is a breakthrough to the cholesteric liquid crystal displays.

5. High Productivity

In some applications the display is required zero voltage storage but no special demand for the driving speed such as information board, electronic book, cellular pone, and GPS and so on. The fact that the full spectrum reflective ChLCD may works at long helical pitch allows larger display cell gap. The bigger cell gap means higher tolerance and higher yield in the LCD production. The monochrome ChLCD is designed to use 3.5 μm cell gap to fit the standard STN driver. With the skill of the present technology the cell gap can be enlarged to 5 µm, which is the standard STN cell gap, thus the display can achieve the same display cell gap at the same driving voltage compared with that of STN display. The productivity, consequently, get improved on the bases of low cost and high yield.

We claim:

1. A full spectrum reflective display comprising:
   a. a plurality of circular polarizers with same polarity but different disposition;
   b. an optical reflective film formed above the circular polarizer that is positioned opposite to the viewing side;
   c. a plurality of transparent conductive patterning substrates juxtaposed to form a cell structure; and
   d. a cholesteric material having intrinsic polarity and predetermined reflective wavelength with controllable planar texture and controllable focal-conic texture disposed between the patterning substrates,
   wherein the cell structure is laminated with at least one surface of the circular polarizer in such a way that a retardation film of the circular polarizer is physically attached to the substrate to guide circular polarized light to the viewing side of the planar texture area of the cholesteric material,
   whereby an optical "on" state will be displayed in the controllable planar texture area of the cell structure and an optical "off" state will be displayed in the controllable focal-conic texture area of the cell structure.

2. The display as in claim 1 wherein the cell structure laminates the circular polarizers in such a way that the front surface attaches one circular polarizer with its optical axis toward the viewing side, i.e., with the portion of linear polarizer to the viewer and the portion of quarter-wave retarder to the cholesteric liquid crystal cell, while the back surface attaches another circular polarizer with its optical axis toward the reflective layer, i.e., with the portion of linear polarizer facing to the reflector and the portion of quarter-wave retarder to the cholesteric liquid crystal cell.

3. The display as in claim 1 wherein the circular polarizers with the same polarity means that the circular polarizer have the same handedness with each other.

4. The display as in claim 1 wherein the circular polarizers have different disposition means that the front light, filtering through the first circular polarizer, converts into circularly polarization, while the reflected back light, filtering through the second circular polarizer, converts into circularly polarization.

5. The display as in claim 1 wherein the optical "on" state is generated by two circularly reflections, i.e., cholesteric liquid crystal's Bragg reflection and circularly reflection from the second circular polarizer when the cholesteric liquid crystal is predetermined in visible wavelength.

6. The display as in claim 1 wherein the optical "off" state is generated by multiple passes of polarization and of light in display's focal-conic area.

7. The display as in claim 6 wherein the polarization is the light filtration of the circular polarizer that cut off at least 50% scattering light in each pass in display's depolarizing area.

8. The display as in claim 6 wherein the multiple passes of polarization and depolarization means that front light is undertaken four passes filtering through polarizers before reaching back to the viewing side.

9. The display as in claim 6 wherein the depolarization is the light scattering effect caused by cholesteric focal conic texture.

10. The display as in claim 6 wherein the depolarization is the light scattering effect caused by cholesteric finger print texture.

11. The display as in claim 6 wherein the depolarization is the light scattering effect caused by cholesteric focal conic and planar coexisting texture.

12. The display as in claim 6 wherein the depolarization is the light scattering effect caused by cholesteric focal conic and finger print coexisting texture.

13. The display as in claim 6 wherein the depolarization is the light scattering effect caused by the imperfection of the optical reflection layer.

* * * * *